United States Patent
Kriss

(10) Patent No.: US 7,215,449 B2
(45) Date of Patent: May 8, 2007

(54) ANTI-CLIPPING COLOR-IMAGE CORRECTION

(75) Inventor: Michael A. Kriss, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 379 days.

(21) Appl. No.: 10/726,197

(22) Filed: Dec. 1, 2003

(65) Prior Publication Data

US 2004/0109203 A1     Jun. 10, 2004

Related U.S. Application Data

(63) Continuation-in-part of application No. 10/277,384, filed on Oct. 21, 2002.

(51) Int. Cl.
G03F 3/08        (2006.01)
H04N 1/403      (2006.01)

(52) U.S. Cl. ........................................ 358/518; 358/2.1

(58) Field of Classification Search ...................... None
See application file for complete search history.

(56) References Cited

U.S. PATENT DOCUMENTS

| | | | |
|---|---|---|---|
| 5,202,935 A | 4/1993 | Kanamori et al. | |
| H1506 H | 12/1995 | Beretta | |
| 5,579,446 A | 11/1996 | Naik et al. | |
| 5,737,032 A * | 4/1998 | Stenzel et al. | 348/649 |
| 6,115,133 A | 9/2000 | Watanabe | |
| 6,239,795 B1 | 5/2001 | Ulrich et al. | |
| 6,259,428 B1 | 7/2001 | Ramchandani et al. | |
| 6,266,103 B1 * | 7/2001 | Barton et al. | 348/675 |
| 6,297,800 B2 | 10/2001 | Dagman | |
| 6,628,827 B1 * | 9/2003 | Acharya | 382/167 |
| 6,956,581 B2 * | 10/2005 | Cui et al. | 345/589 |
| 6,977,661 B1 * | 12/2005 | Stokes et al. | 345/589 |
| 2001/0002125 A1 | 5/2001 | Dagman | |

FOREIGN PATENT DOCUMENTS

| | | |
|---|---|---|
| EP | 1152322 A2 | 7/2001 |
| JP | 2001005244 A | 1/2001 |
| WO | WO 01/89202 A2 | 11/2001 |
| WO | WO 01/89202 A3 | 11/2001 |

* cited by examiner

*Primary Examiner*—King Y. Poon
*Assistant Examiner*—Myles D. Robinson
(74) *Attorney, Agent, or Firm*—Jon M. Dickinson, PC; Robert D. Varitz, PC

(57) ABSTRACT

Computer-based, anti-clipping, pre-printing, color-image correction via virtual color-parameter controllers that are provided within the graphic user interface of a print drier. Parameters accommodated include Red, Green and Blue offset, Lightness offset, Gamma and Chroma. Chroma modifications are handled preliminarily by a special mathematical matrix. In one embodiment of the invention, matrix-processed Chroma values are directly inserted into an algorithm, and are then co-processed with other parameter modifications within an anti-clipping, hyperbolic-tangent-function (asymptotic-like) algorithm which implements an asymptotic-like approach toward creating final pixel modification values that avoid range-limit color and/or tone-scale clipping. In another embodiment of the invention, matrix-processed Chroma values are additionally inserted in to such an algorithm as components of a pair of like cubic terms. These cubic terms function to enhance asymptotic behavior of the algorithm in certain situations. Final pixel values are drawn from three one-dimensional look-up tables, one for each of the three colors. These tables which, save overall computational time, are based upon prior user approval of a low-pixel-count sub-sampled preview image of the whole, larger, original image, in which preview image the expected effects of color parameter changes are observable.

6 Claims, 2 Drawing Sheets

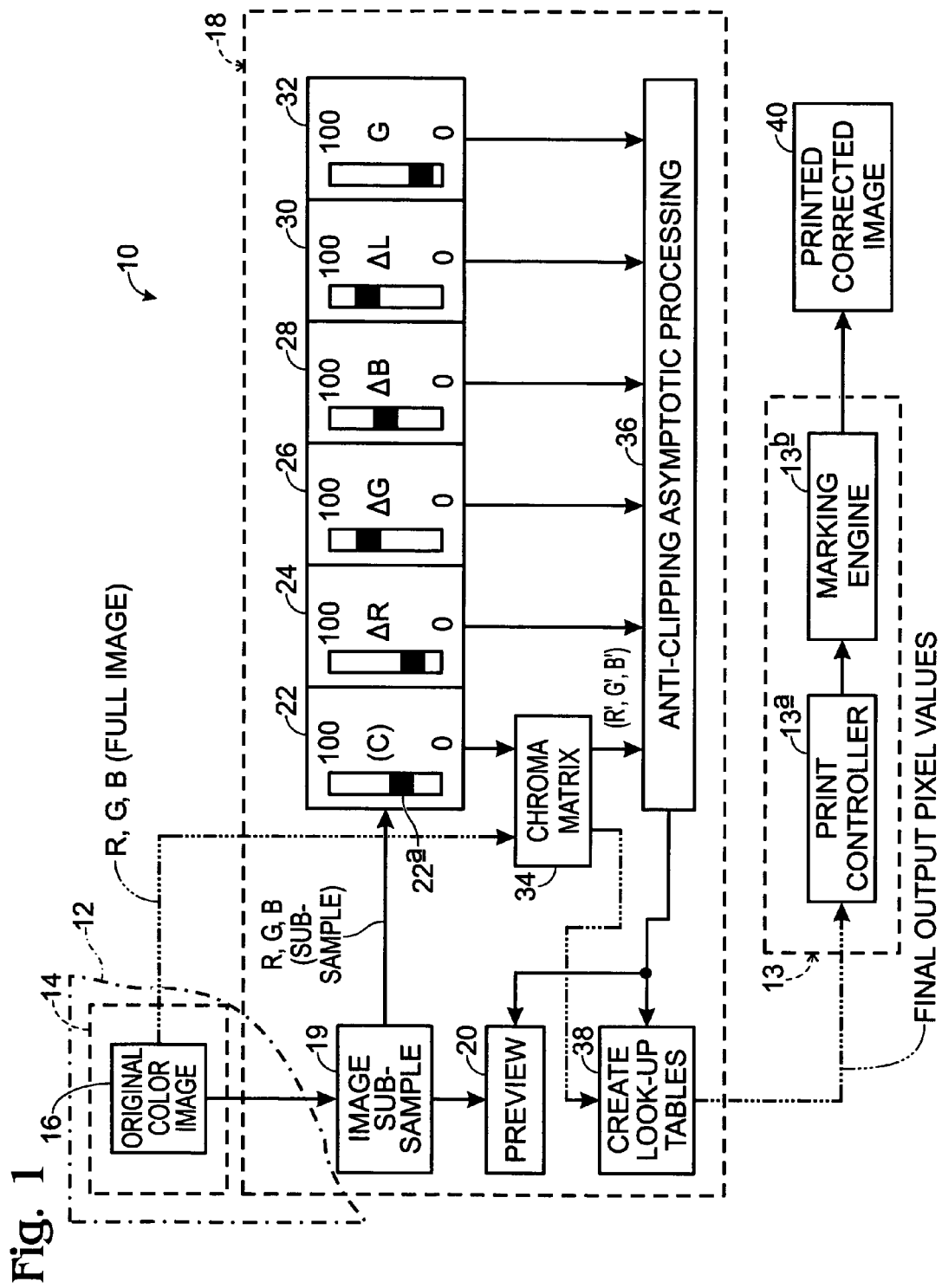

Fig. 2

TABLE I

|  | CONTROLLER RANGE | CODE VALUE RANGE |
|---|---|---|
| ΔR | 0-100 | -50 → +50 |
| ΔG | 0-100 | -50 → +50 |
| ΔB | 0-100 | -50 → +50 |
| ΔL | 0-100 | -50 → +50 |
| G | 0-100 | 20 → 150 |
| C | 0-100 | 0 → 2 |

Fig. 3

TABLE II

$$\begin{pmatrix} R' \\ G' \\ B' \end{pmatrix} = \begin{pmatrix} .3086(1-C)+C & .6094(1-C) & .082(1-C) \\ .3086(1-C) & .6094(1-C)+C & .082(1-C) \\ .3086(1-C) & .6094(1-C) & .082(1-C)+C \end{pmatrix} \begin{pmatrix} R \\ G \\ B \end{pmatrix}$$

Fig. 4

TABLE III

$$\text{OUTPUT} = \frac{255}{4} \begin{pmatrix} (1 + \text{TANH}[(\text{INPUT} + \Delta L - 128 - G + \Delta R)/G]) + \\ (1 + \text{TANH}[(\text{INPUT} + \Delta L - 128 + G + \Delta R)/G]) \end{pmatrix}$$

Fig. 5

TABLE IV

$$\left(\frac{255}{4}\right) \begin{pmatrix} (1 + \text{TANH}[((\text{INPUT}-128) + \beta(\text{INPUT}-128)^3 + \Delta L - G + \Delta R)/G]) + \\ (1 + \text{TANH}[((\text{INPUT}-128) + \beta(\text{INPUT}-128)^3 + \Delta L + G + \Delta R)/G]) \end{pmatrix}$$

ANTI-CLIPPING COLOR-IMAGE CORRECTION

CROSS REFERENCE TO RELATED APPLICATION

This is a continuation-in part of prior-filed, currently co-pending U.S. patent application Ser. No. 10/277,384, filed Oct. 21, 2002, for "Graphic-Interface, Anti-Clipping, Color-Image Correction. Appropriate priority to this earlier-filed case is claimed.

BACKGROUND AND SUMMARY OF THE INVENTION INTRODUCTION

This invention relates to a computer-based system and to a related methodology which enable a user to perform pre-printing, plural-parameter, anti-clipping color correction of a selected color image. More particularly, it pertains to such a system and methodology which operate under user control through the graphic interface provided by a print driver that is to be employed to control the printing of such an image. The "invention" as employed herein has a plurality meaning which embraces multiple disclosed and perceivable embodiments and manners of proficiency.

As computers and user-friendly computer processing have become more and more regularly involved in people's daily lives, such involvement has generated a fast-rising interest in do-it-yourself color-image processing, such as photo-image processing. Expanding computer-friendly sophistication indeed has promoted individuals' desires to self-perform more than just very modest and simple color processing, and in fact to perform quite elaborate processing without having to engage a difficult "learning curve" to avoid tonal clipping tangles and mishaps.

The present invention, disclosed herein, particularly in its best mode configuration, in an environment of simplicity, versatility and sophistication, effectively addresses such users' current growing interests in performing elaborate color-image processing, and does so in a manner which guards against undesirable mishaps such as color and/or tone-scale clipping. Such clipping, which occurs when a key color parameter creates pixel values that lie outside an acceptable intensity value range (computer scale range 0–255) can all too easily and unexpectedly bloom because of the fact that various different color-affecting parameters are interlinked and interdependent in ways that are complex, cross-magnifying, and not necessarily intuitive.

According to the preferred forms and best mode of the system and the related methodology of this invention, the invention offers a color-image printing setting wherein, within the graphic interface of a print driver, a user is furnished a family of different virtual-slider, color-parameter controllers that allow for "large range" parameter-value adjustments, without there being any possibility for any pattern of slider adjustments to create clipping of the types just mentioned above. These controllers or controls, are also referred to herein as value adjusters, as change-value color controls, as color-adjustment controls, and as color-parameter controls. The particular parameters so accommodated include (1) Red offset ($\Delta R$), (2) Green offset ($\Delta G$), (3) Blue offset ($B\Delta$), (4) Chroma (c) (saturation), (5) Lightness offset ($\Delta L$), and (6) Gamma (G) (contrast). While virtual sliders are specifically illustrated, modified controllers of various different virtual kinds could be used as well. The driver also furnishes the user with a preview sub-screen in which there is presented a limited-pixel-count sub-sample of the original of the full-pixel version of an image selected for processing and printing.

These controllers visually allow for associated parameter-value adjustments to be made in the preview image sub-sample within a positive input range of 0–100, which range is equation-related, as will later be explained, to the traditional computer-scale range of 0–255, or at least to a portion of that scale range. The 0–100 input range has been selected for best mode implementation of the invention because of its intuitive convenience. Those skilled in the art will certainly recognize, however, that different controller scales could be employed. For each parameter, the associated input and computer-scale ranges are directly, though not in each case linearly, related to a defined, modified parameter code-value range, from within which range output pixel values are calculated for assessment-modification of the preview image sub-sample created in accordance with the invention. All parameters except the Gamma parameter possess such a range relationship which is linear. As a controller slider for a parameter is "moved" throughout the input range of 0–100, new parameter output values (from the controller) relatedly follow this movement with values drawn from the associated parameter code-value range. Calculated, related color changes appear in the image sub-sample.

Of all of the six mentioned parameters, the Chroma parameter is the one with respect to which the most mischievous clipping problems are associated. Accordingly, the practice of the present invention treats adjustments made to this parameter in a special preliminary manner (first-level attention) before creating ultimate final pixel-output intensity values resulting from dealing collectively with all six of the named parameters. Chroma values are firstly processed, as will be explained and illustrated below, in a special 3×3 mathematical matrix for each of the three colors Red, Green, and Blue. The matrix preserves the neutral colors with Chroma user-settings that increase or decrease prospective color saturation.

These matrix-processed Chroma values are then operatively "combined", in either one of two, different manners (in accordance with two different embodiments of the invention), with the other five parameter values (second-level attention) in a special anti-clipping algorithm (or structure) which, in what is referred to herein as an asymptotic-like governance manner, controls algorithm output pixel values so as to prevent such values from going beyond the desired computer-scale range of 0–255. This algorithm, which thus acts as an asymptotic-like limit structure, allows output parameter values gracefully to approach, and even to reach, but not to go beyond, the 0–255 range limits. In one of the above-mentioned, two, different embodiments of the invention, a selected and matrix-processed Chroma value is simply directly inserted as a term in two different "arguments" that form parts of the mentioned algorithm. In the other embodiment, such a selected, matrix-processed Chroma value is also inserted into the same two just-mentioned "arguments" as components of a new cubic term (twice appearing in the algorithm) which is not employed in the first-mentioned algorithm embodiment. This added cubic term, which introduces a slight amount of additional algorithmic processing time, is nonetheless useful in certain instances to enhance the manner in which ultimate algorithmic output values behave asymptotically. The mentioned matrix and algorithm collectively constitute output control structure.

During image adjustment/correction activity, each set of controller output parameter values is applied through calculation to the image presented in the preview sub-screen provided by the print driver in the associated graphic user interface. Such value applications change the color character of the preview image so as to inform the user about the expected effects of parameter changes.

When the user is satisfied with the look of the modified sub-sample image so presented, the controller sliders are left fixed in their positions, and the anti-clipping algorithm is employed for another purpose. More specifically, this other purpose takes hold when the satisfied user issues a print command. When that occurs, appropriate, computation-time-saving, one-dimensional look-up tables for the three colors are generated. This is done by employing the anti-clipping algorithm to calculate, for each color, a set of output values resulting from stepping one of the constituent variables, called "input", in the algorithm seriatim through a range of selected code-value numbers, such as from −250 to +500. These range numbers each stands as an arbitrary surrogate in the place (in the algorithm) of a Chroma matrix output value. The algorithm output values so calculated for a given color effectively "say": For an algorithm "input" value of Xn, the correct output value for this pixel color is Yn. These calculated algorithm output values form the look-up tables, which values, of course, take directly into account the appropriate $\Delta R$, $\Delta G$, $\Delta B$, $\Delta L$ and G controller values which the user has previously determined are acceptable. (Recall that the desired $\Delta R$, $\Delta G$, $\Delta B$, $\Delta L$ and G controller values have been held fixed during the time period of look-up table generation).

With the look-up tables thus created, the full original image (all pixels) is effectively run through both the Chroma matrix and the color look-up tables, with the Chroma matrix now employing the previously pre-set Chroma parameter value (c) established during assessment-operation of the virtual slider parameter controllers. This "run-through" information is sent to the appropriate printing device's print controller for final color-corrected image output printing.

The invention thus proposes a computer-based print-driver-controlled system and methodology which offer to a user, in the graphic interface of a print driver, virtual controls, such as "grab-and-adjust" manipulable sliders, to vary (1) Red, Green, Blue, and/or Lightness offsets, (2) Gamma (contrast), and (3) Chroma (saturation). The print driver also furnishes an image preview sub-screen wherein the expected effects of parameter valuation can be observed.

In the context of the preliminarily matrixed Chroma adjustment(s), all other parameter-variation values are processed to finality, on a pixel-by-pixel basis, and in an asymptotic-like manner to prevent color and/or tone-scale clipping. These finality values are prepared for use in the efficient form of the mentioned three, one-dimensional look-up tables related to the three colors Red, Green and Blue. User-invoked color modifications (corrections) are presented, prior to printing, in the driver-furnished preview image sub-screen. This, of course, handily permits a user to approve an expected "corrected" outcome in a to-be-printed image before printing begins. If the user notes any aspect of such a preview which does not seem desirable, the user may then simply continue to apply corrective controls through the virtual control sliders provided according to the invention by the print-driver graphic interface. Thus, the invention readily accommodates clipping-free interactive decision making and corrective color implementation by a user.

Within the descriptive text which follows below, and in the drawing figures, certain word and character designators are employed as follows:

R—Original Image Red pixel values
G—Original Image Green pixel values
B—Original Image Blue pixel values
R'—Chroma-matrix processed Red pixel values
G'—Chroma-matrix processed Green pixel values
B'—Chroma-matrix processed Blue pixel values
$\Delta R$—Slidebar controller modified Red offset pixel values
$\Delta G$—Slidebar controller modified Green offset pixel values
$\Delta B$—Slidebar controller modified Blue offset pixel values
$\Delta L$—Slidebar controller modified Lightness offset pixel values
G—Slidebar controller modified Gamma pixel values
c—Adjusted Red, Green or Blue Chroma values which result from use of the provided virtual Chroma parameter slidebar controller, and which are supplied to and processed in the mathematical Chroma matrix.
Input—A Red, Green or Blue Chroma-matrix processed pixel value which is supplied to and processed in the asymptotic-like anti-clipping algorithm.

These and other significant features and advantages which are offered by the system and method of this invention will become more fully apparent as the descriptions thereof which now follow are read in conjunction with the accompanying drawings.

DESCRIPTION OF THE DRAWINGS

FIG. 1 is a block/schematic diagram, appropriately text labeled, illustrating both a preferred system constructed in accordance with the present invention, and a preferred manner of practicing the methodology offered by this system.

FIG. 2 pictures a table, labeled Table I, describing controller and output code-value ranges that are associated with parameter adjustment activity.

FIG. 3 presents another table, labeled Table II, which describes what is referred to herein as the mathematical Chroma matrix that is employed, in accordance with the invention, to deal, in a primary manner, with user-implemented Chroma parameter value changes.

FIG. 4 presents yet another table, labeled Table III, describing one embodiment of an anti-clipping, asymptotic-like processing algorithm which is employed along the way to create final pixel intensity values based upon user implementation of selected ones of a plurality of color-affecting parameters associated with a selected, printable, color image.

FIG. 5 presents still another table, labeled Table IV, describing another embodiment of an anti-clipping, asymptotic-like processing algorithm which is modified, in relation to the FIG. 4 algorithm, to include a pair of cubic terms that are employed to enhance certain asymptotic behavior of the algorithm.

DETAILED DESCRIPTION OF THE INVENTION

Turning now to the drawings, and referring first of all to FIG. 1, here there is indicated generally at 10 a computer-based system and a related methodology which permit user manipulation and correction selectively of a plurality of color-affecting parameters that are to be associated with a printable color image. Included in system 10, as shown in FIG. 1, is a digital computer 12 (shown only fragmentarily in dash-dot lines), and a printing device 13 (shown by dashed lines) which will ultimately print a color image that has been parameter-modified by a user in accordance with practice of the invention. Installed in computer 12 is, for example, a color-image creating and/or managing application 14 in which there is held an original color image 16 that is intended (has been selected), ultimately, to be sent to printing device 13 for output printing.

Associated with application 14 in computer 12 is a print driver 18 which has been constructed in accordance with the present invention to afford and allow user correction of several different important color-affecting parameters relating to a selected color image, such as image 16. When print driver 18 has been invoked for use in conjunction with preparing to print image 16, the driver presents a graphic interface on the display screen associated with the computer, which interface offers a preview image sub-sampler 19, and a preview sub-screen 20 that allows a user to see, fairly accurately, just how a final printed image (derived from image 16) will probably appear after printing. The image sub-sampler receives the a full pixel-count R, G, B image data package from image 16, and presents a lower-pixel-count R, G, B sub-sample image data package to sub-screen 20, and to a certain set of virtual parameter controllers in the print driver now to be described. In accordance with the present invention, print driver 18 also presents in its graphic interface this just-mentioned set of virtual (slider) controllers, six in total number herein, including a Chroma (c) controller 22, a Red offset ($\Delta R$) controller 24, a Green offset ($\Delta G$) controller 26, a Blue offset ($\Delta B$) controller 28, a Lightness offset ($\Delta L$) controller 30, and a Gamma (G) controller 32. The Chroma controller relates to color saturation, and the Gamma controller to contrast.

As can be seen in FIG. 1, each of these virtual slider controllers is pictured with a slider, such as slider 22a in controller 22, which slider can be adjusted between controller range values 0–100, inclusive. These sliders are useable in a very conventional manner employing a mouse, etc., to grab and virtually move the slider up and down along the scale of presented values.

Further included in print driver 18, as pictured in FIG. 1, are three additional elements, including a mathematical software Chroma matrix 34, an anti-clipping, asymptotic-like processing algorithm 36, and an appropriate software structure 38 for creating, as will be explained shortly, three one-dimensional look-up tables. Matrix 34 and algorithm 36 are specially constructed in accordance with the present invention. Software structure 38 is conventional in its architecture.

Within the realm of computer 12, the created image sub-sample presents Red, Green and Blue pixel values (R,G,B) both to preview sub-screen 20 and to the six virtual slider controllers just mentioned above. Chroma controller 22, which allows a user to change pixel Chroma values (c) as will shortly be explained, feeds changed Chroma values to Chroma matrix 34 which feeds matrix-treated Red, Green and Blue Chroma pixel values, referred herein as R', G', B', to anti-clipping algorithm 36. The Red, Green and Blue offset slider controllers feed user-varied color offset pixel values $\Delta R$, $\Delta G$, $\Delta B$ directly from the respective associated slider controllers to the anti-clipping algorithm. The Lightness offset and Gamma slider controllers feed modified Lightness and Gamma pixel values, $\Delta L$ and G, also to the anti-clipping algorithm as shown.

New pixel output values created through processing by algorithm 36 during assessment for picture color correction, are fed directly to preview sub-screen 20. Here the user makes judgements about desired adjustments in color parameters.

Completing a description of what is pictured in FIG. 1, included within printing device 13 are the usual print controller 13a and the usual marking engine 13b. Marking engine 13b, when printing is called for, prints, in accordance with this invention, a color-corrected, or modified, hard copy version 40 of original color image 16.

In accordance with practice of the present invention, under circumstances wherein an original color image, such as color image 16, has been selected for printing, and is presented in sub-sample form for user observation within preview sub-screen 20 in the print driver graphic interface, the user, also from within this same interface, selectively manipulates one or more of the six slider controllers to make appropriate user-determined adjustments selectively, in the Chroma, Red offset, Green offset, Blue offset, Lightness offset and Gamma pixel values. Adjustments made are pictured on sub-screen 20.

FIG. 2, when examined along with FIG. 1, describes generally how manipulation of the virtual sliders in controllers 22–32, inclusive, produce output control-code values within related ranges. With respect to each of the specific color offset controllers (24,26,28), movement of the associated slider throughout the 0–100 controller range linearly and directly creates an output color-offset value is accordance with the equation: Output Value=Slider Setting−50. Thus, an offset slider setting of 63 produces an output value of 13 (within the code scale range 0–255).

Movement of the Lightness offset controller slider produces an output value in accordance with the equation: Output Value=Slider Setting−50. Thus, a lightness slider setting of 81 produces an output value of 31 (within the code scale range 0–255).

Movement of the Chroma slider produces an output value determined in accordance with the equation: Output Value=Slider Setting/50. Accordingly, a Chroma slider setting of 75 produces an output value of 1.5.

Finally, movement of the Gamma slider produces an output value calculated by the equation: Output Value=150−2.3 (Slider Setting)+0.01 (Slider Setting)$^2$. Thus, a Gamma slider setting of 10 produces an output value of 128.

It is the intention of the present invention to assure that, no matter how a user elects to change any particular color-parameter value, effectively, and after all value changes have been entered, there will be no final output pixel value which lies outside of the computer-scale range of 0–255.

When a user manipulates the virtual sliders in any or all of these six controllers, the controllers produce appropriate output code-values in accordance with the above equations. The values furnished by controllers 24, 26, 28, 30, 32 are fed directly to anti-clipping algorithm 36. However, the output code-value created and sent by controller 22 is fed indirectly to the anti-clipping algorithm through Chroma matrix 34. It is the output, revised Chroma values derived from the Chroma matrix which are fed to the anti-clipping algorithm.

The mathematical Chroma matrix which processes output Chroma values from controller 22 is fully expressed in Table II in FIG. 3 of the drawings. In the matrix presented in Table II, and as was mentioned earlier, the value "c" is the adjusted Chroma output value which is provided from controller 22 to the matrix. The output R', G' and B' values derived from the matrix are represented in Table II within the bracket containing the letters R', G', B'. In accordance with practice of the invention, Chroma matrix 34 operates on Chroma value variations implemented by a user before the system of the invention operates to produce new output pixel values by and within the anti-clipping algorithm 36.

Table III in FIG. 4 describes (specifically illustrated, for the color Red) one embodiment of an asymptotic-like anti-clipping algorithm which operates on the received R', G', B', ΔR, ΔG, ΔB, ΔL and G values to produce, on a pixel-by-pixel basis, new pixel values which will change the appearance character of the prospective, printable color image. It should be understood that, while the anti-clipping algorithm is specifically illustrated in the FIG. 4 for the color Red, exactly the same algorithmic treatment may be provided for each of the other two colors. As can be seen, the matrix-processed R', G', B' values are here inserted (INPUT) directly into two different "arguments" which form parts of the illustrated algorithm.

Table IV in FIG. 5 describes (also specifically illustrated, for the color Red) another embodiment of an asymptotic-like anti-clipping algorithm which operates on the received R', G', B', ΔR, ΔG, ΔB, ΔL and G values to produce, on a pixel-by-pixel basis, new pixel values which will change the appearance character of the prospective, printable color image. In this embodiment of the algorithm, the matrix-processed R', G', B' values are also inserted (INPUT) into two, like cubic terms that are contained within the algorithm.

According to practice of the invention, with operations of virtual controllers 22-32, inclusive, as shown, all new output pixel values which have been created by algorithm 36, will have values that definitively lie within the traditional computer value range of 0–255. No color or tone-scale clipping will occur.

A user will see in preview sub-screen 20 a changed image in accordance with the entries of these new values, and if unsatisfied with any aspect of change, can iteratively revise changes by re-employing any one of more of the virtual controllers until he or she observes a proposed printable image that is satisfactory.

When that status is reached, a print command initiates the chain of activity earlier described herein involving the creation of Red, Green and Blue look-up tables, and subsequent processing of the full original image through the Chroma matrix and the prepared look-up tables to generate final, corrected output pixel values for printing. These table values are furnished appropriately to print controller 13a, which then operates marking engine 13b to create the printed corrected image pictured at 40 in FIG. 1. This chain of activity is represented in FIG. 1 by the dash-triple-dot arrowheaded lines.

Thus, the invention provides a very simple yet very sophisticated anti-clipping-guarded opportunity, from within the graphic interface of a print driver, for a user to enact substantial color-parameter manipulation in a proposed-to-be-printed color image.

While different specific approaches can be employed with respect to how final pixel output values are handled, the employment, as proposed herein, of one-dimensional lookup tables, based upon earlier calculations that relate to color approval of a small-pixel-count sub-sample image, one table each for the three colors Red, Green and Blue, offers a very simple approach which minimizes overall computer processing time.

By preliminarily applying Chroma matrix processing to changed Chroma values as illustrated and described, this variable, which is extremely sensitive with respect to how it intertwines with other parameters, is not allowed to interfere in a way which could cause unwanted clipping. Final processing operation of the anti-clipping asymptotic-like algorithm takes place only with respect to the matrix-processed Chroma values, along with the other new parameter values that may have been created by user manipulation of the slider controllers.

While a very specific best-mode anti-clipping algorithm has particularly been illustrated and described herein, it is entirely possible that various modified forms of similarly "asymptotically functioning" algorithms could be used. Also, while final corrected image assembly proceeds, as described herein, with the efficient aid of look-up tables, there may be applications which such assembly is more preferably accomplished, for example, a pixel-by-pixel value-calculation basis. Also, different specific code-value scale ranges could in modified forms of the invention, be employed with appropriately configured output value equations relating these ranges to selected controller ranges.

Accordingly, while a preferred embodiment and manner of practicing the invention have been described herein, along with certain modifications, it is appreciated that variations and modifications may be made without departing from the spirit of the invention.

I claim:

1. A computer-based image-manipulation method for enabling anti-clipping, selective user control over a color-affecting parameter in a computer-presented color image which is intended to be printed, where clipping is defined by the occurrence of an unintended condition, based upon user control input, wherein that parameter assumes a value which lies outside a desired value range which is directly associated with the computer-recognized number value range of 0–255, said method comprising:

furnishing suitable computer-responsive, change-value color controls that are selectively manipulable by a user to effect changes, ultimately, in such a parameter value, thus to vary a certain characteristic of color in the image, and applying predetermined governance over the actual value of the color-affecting parameter, including (a) implementing preliminary matrix processing of a user-chosen Chroma value, followed by (b) implementing for each respective color-space color, an anti-clipping algorithm in accordance with the algorithmic formula expressed as follows:

$$\text{OUTPUT} = \frac{255}{4}\left(\begin{array}{l}[1 + TANH([\text{INPUT} + \Delta L - 128 - G + \Delta R]/G)] + \\ [1 + TANH([\text{INPUT} + \Delta L - 128 + G + \Delta R]/G)]\end{array}\right)$$

whereby, no matter the input control implemented by the user, that user chosen value is constrained in relation to approaching either one of the two limit values in the mentioned range to an asymptotic-like approach toward such limit value.

2. The method of claim 1, wherein the application of governance involves inserting a selected, matrix-processed Chroma value directly into the mentioned anti-clipping algorithm.

3. The method of claim 1, wherein said furnishing of controls includes providing individual controllers each relating to at least one of the collection of color parameters drawn from the list including (a) Red, Green and Blue color offset, (b) Lightness offset, (c) Chroma, and (d) Gamma.

4. The method of claim 1, wherein the algorithmic formula expressed as follows:

$$\text{OUTPUT} = \frac{255}{4} \left( \begin{array}{l} [1 + TANH([\text{INPUT} + \Delta L - 128 - G + \Delta R]/G)] + \\ [1 + TANH([\text{INPUT} + \Delta L - 128 + G + \Delta R]/G)] \end{array} \right)$$

is modified as expressed by the modifified algorithmic formula as follows:

$$\left(\frac{255}{4}\right) \left( \begin{array}{l} [1 + TANH([(\text{INPUT} - 128) + B(\text{INPUT} - 128)^3 + \\ \Delta L - G + \Delta R]/G)] + [1 + TANH([(\text{INPUT} - 128) + \\ B(\text{INPUT} - 128)^3 + \Delta L + G + \Delta R]/G)] \end{array} \right).$$

5. The method of claim 4, wherein said applying of governance involves inserting a selected, matrix-processed Chroma value directly into the mentioned modified algorithmic formula.

6. The method of claim 4, wherein said furnishing of controls includes providing individual controllers each relating to at least one of the collection of color parameters drawn from the list including (a) Red, Green and Blue color offset, (b) Lightness offset, (c) Chroma, and (d) Gamma.

* * * * *